United States Patent [19]

Giulie et al.

[11] 4,259,143
[45] Mar. 31, 1981

[54] LAMINATING MACHINE

[75] Inventors: Joe D. Giulie; Robert J. Reiss, both of Palo Alto, Calif.

[73] Assignee: General Binding Corporation, Northbrook, Ill.

[21] Appl. No.: 965,518

[22] Filed: Dec. 1, 1978

[51] Int. Cl.³ .......................... B30B 5/06; B30B 15/34
[52] U.S. Cl. .............................. 156/499; 100/93 RP; 100/151; 156/522; 156/555; 156/583.5
[58] Field of Search ...................... 156/555, 583.5, 582, 156/499, 552, 522; 100/93 RP, 151, 154

[56] References Cited

U.S. PATENT DOCUMENTS

| | | | |
|---|---|---|---|
| 2,132,152 | 10/1938 | Fischer | 156/555 |
| 2,680,468 | 6/1954 | Lewis | 100/93 RP |
| 2,800,162 | 7/1957 | Rohdin | 156/583.5 X |
| 3,138,695 | 6/1964 | Bracich | 100/93 RP |
| 3,185,073 | 5/1965 | Van Hartesveld et al. | 156/583.5 |
| 3,229,620 | 1/1966 | Rogers et al. | 156/583.5 X |
| 3,378,430 | 4/1968 | Aizawa | 100/556 |
| 3,547,742 | 12/1970 | Cottrell | 156/583.5 |
| 3,737,359 | 6/1973 | Levitan | 156/555 X |
| 3,738,897 | 6/1973 | Bianchini | 156/583.5 |
| 3,823,047 | 7/1974 | Colombo | 156/499 |
| 3,840,420 | 10/1974 | Sarcia | 100/93 RP X |
| 3,901,758 | 8/1975 | Humphries | 156/582 X |
| 4,021,288 | 5/1977 | Hannon et al. | 156/499 |

*Primary Examiner*—Michael G. Wityshyn
*Attorney, Agent, or Firm*—Hill, Van Santen, Stedman, Chiara & Simpson

[57] ABSTRACT

An improved motor-driven laminating machine is provided which is adapted to laminate articles by use of endless belt drive either when they are contained in prefabricated laminating packets or utilizing continuous webs of laminating material. The endless belts serve as a carrier when the laminating packets are employed.

11 Claims, 7 Drawing Figures

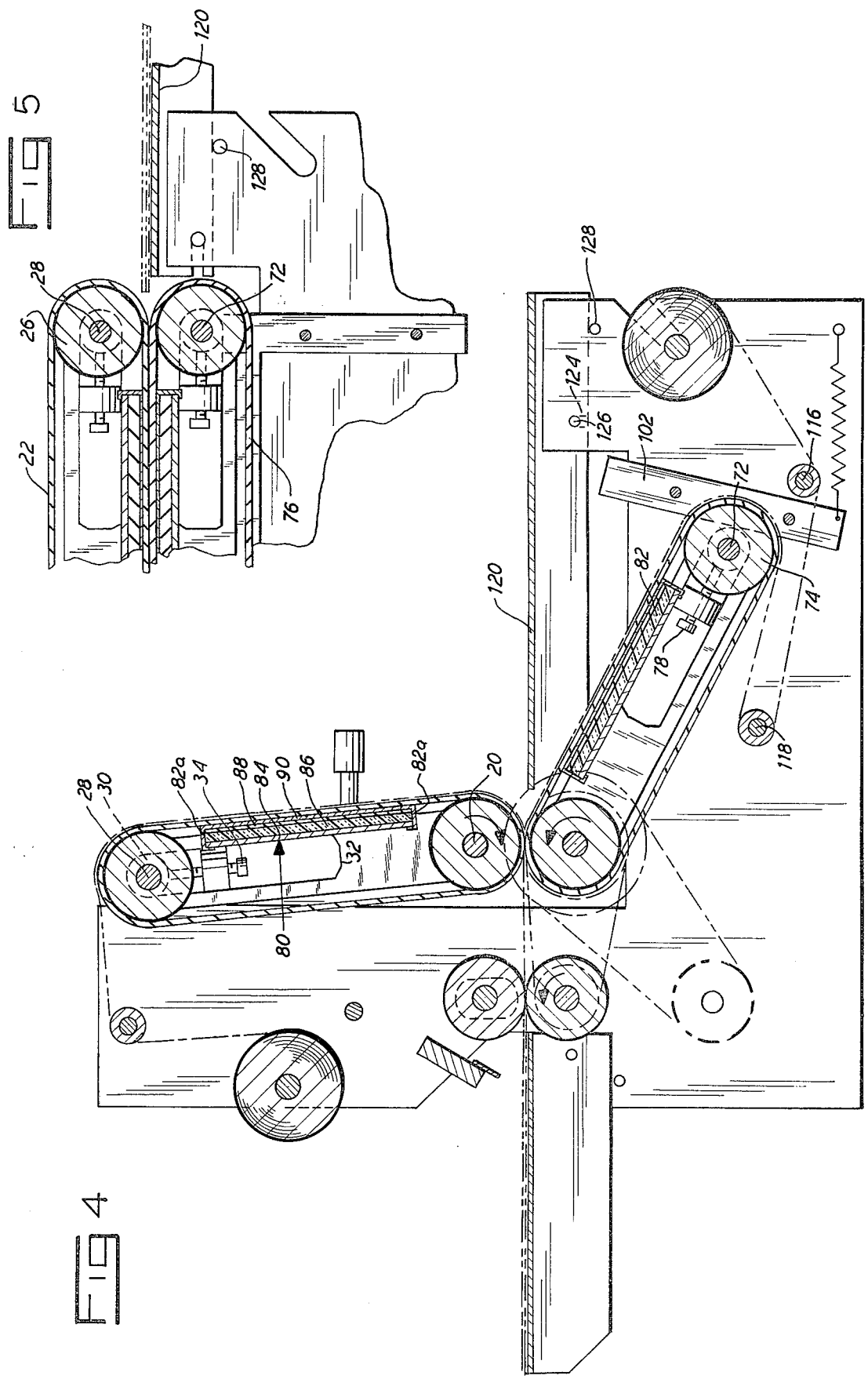

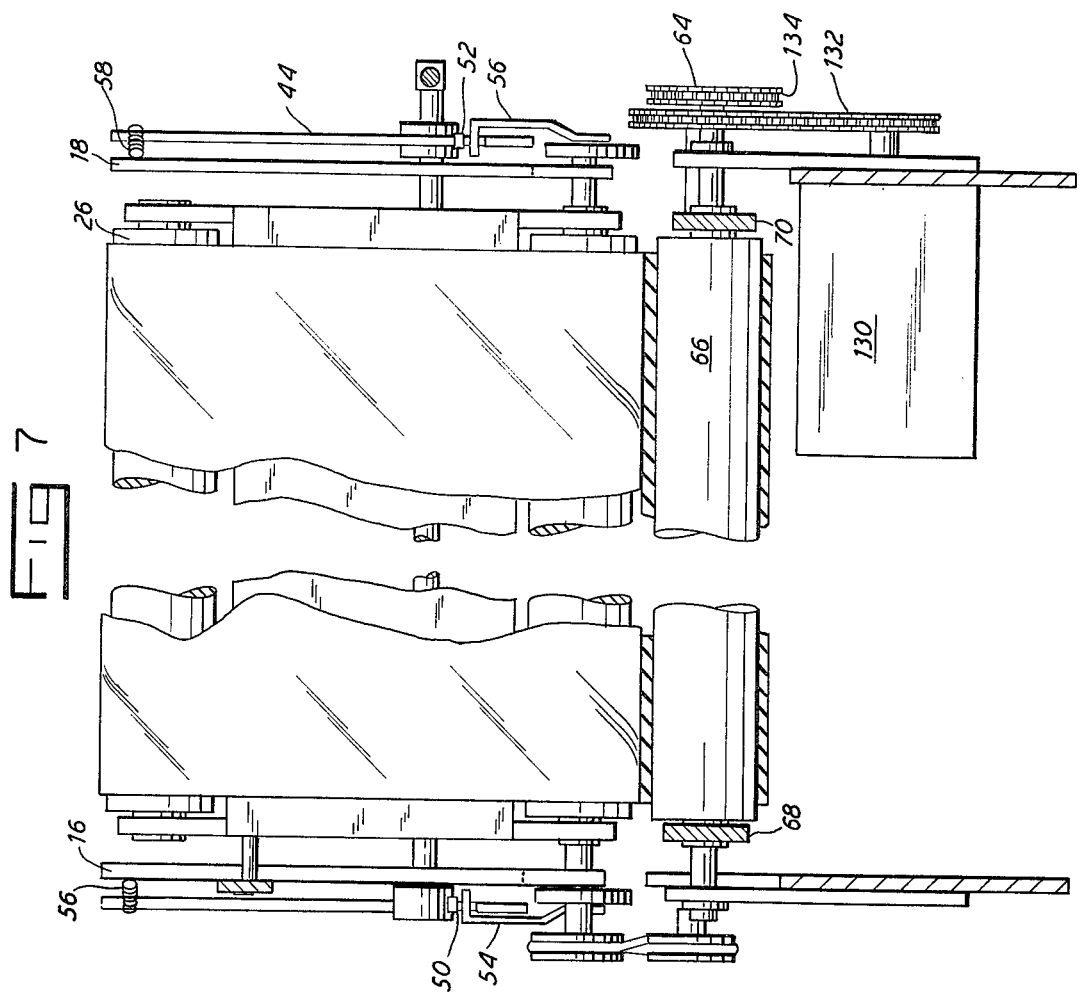
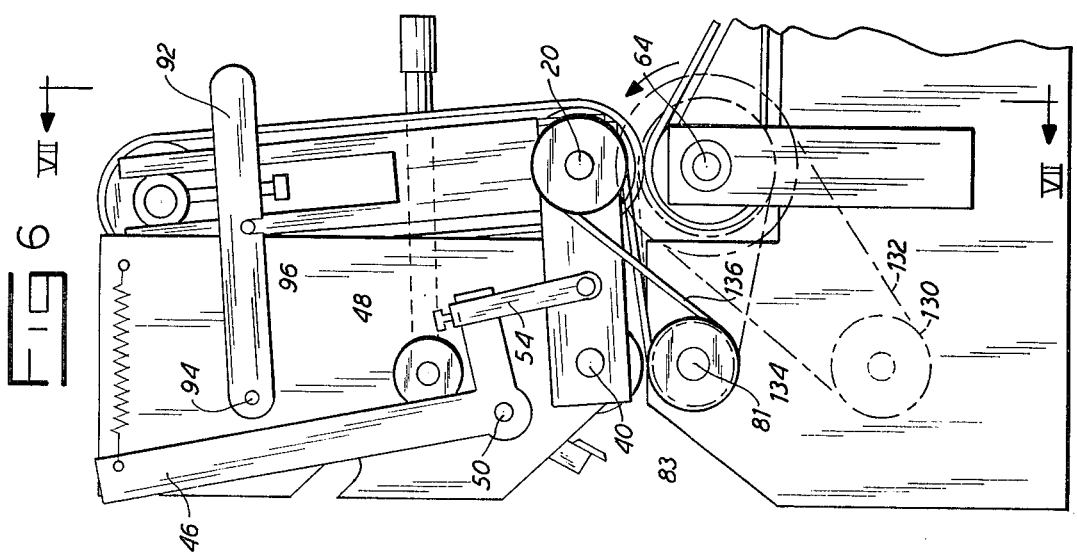

LAMINATING MACHINE

BACKGROUND OF THE INVENTION

Laminating machines ordinarily can operate on one of two types of laminating material. Machines designed for a high throughput are provided with continuous rolls of laminating film and an upper and lower web are brought together with the material to be laminated between the webs and the webs are heated and then squeezed together under pressure to produce the laminated article. It is obvious that such machines are not well adapted for use when only one or a few articles are to be laminated. Thus, such machines find their primary application among relatively large industrial users and are not suitable for use in small offices, libraries or the like.

A second type of machine is primarily adapted for use with prefabricated laminating packets which consist of two laminating sheets held together at one end. Such prefabricated laminating packets which make use of a tear-off tab are described and claimed in copending application Ser. No. 784,668 filed Apr. 5, 1977, now U.S. Pat. No. 4,185,405. Such machines are well adapted for short runs or even a single operation but are not well suited for long runs. Also such machines typically utilize a folded carrier for handling and also for isolating the packets from the machine heating elements. Such carriers prevent scratching of the laminate and leak through of melted adhesive.

The laminating sheets themselves (whether in the form of continuous webs or packets) ordinarily consist of a pair of plastic sheets and ordinarily one of the sheets is transparent (at least after the lamination operation) and usually both sheets would be transparent. At least one of the sheets must have a heat-activated adhesive or a thermoplastic coating facing the opposite sheet and normally both sheets are so constituted. The sheets are preferably of Mylar film coated with a thin layer of a thermoplastic material such as a polyolefin, suitably polyethylene.

SUMMARY OF THE INVENTION

It is an object of this invention to provide a laminating machine which utilizes endless belts as an integral part of the laminating process.

It is another object of this invention to provide an endless belt laminating system wherein laminating packets may be processed without the need for additional carrier members for holding the laminating packets.

It is another object of this invention to provide a laminating process in which endless belts are employed and heaters are positioned within the endless belts so as to radiate heat through the endless belts and activate heat activatable adhesive on laminating material to be coated on the product being laminated.

It is a further object of this invention to provide a laminating machine using endless belts which is convertible from a mode utilizing two continuous webs of heat sealing film for continuous lamination to a second mode utilizing prefabricated laminating packets.

According to the invention, first and second endless belts are provided with a heater positioned within at least one of the belts to radiate heat through the belt. Each belt has guide means and the belts are positioned so that they contact each other so as to form a moving engaging system to which a product to be laminated is fed. For laminating individual packets, each of the endless belts is guided such that a planar portion of one of the endless belts is in contact with a similar planar portion of the other endless belt. Heating members are then positioned adjacent the planar portions. The laminating packet with the product inside thereof is then fed between the planar portions of the endless belts where the heat activatable adhesive of the packet is activated. In another form of the invention, continuous webs of laminating film are directed over respective endless belts and heated through the endless belts. A product is then continuously fed between the endless belts at a contact point together with the continuous webs of film.

Also in accordance with the present invention, a laminated machine is provided which is motor-driven and which is easily converted, in a single operation and without the use of tools, from a first mode wherein the laminating film is supplied as a continuous web and a second mode wherein the laminator is suitable for use with prefabricated laminating packets.

Thus, the machine of the present invention is one of great versatility, permitting it to be used on long production runs yet easily converted to a one-time operation for short runs. Thus, a machine is provided which is affordable by even small businesses and libraries yet which has the capability of economically handling long runs.

One feature of the present invention is that it is not length limited, either in the continuous or individual mode, so that articles of great length can be laminated without difficulty.

A further feature of the invention is to provide a convertible laminating machine wherein both the pressure rollers and the feed rollers are spring-biased by a single pair of springs, yet which permits them to open independently.

BRIEF DESCRIPTION OF THE DRAWINGS

FIG. 4 is a side view, partly in section, showing the position of the belts and feed table when laminating continuous webs of film.

FIG. 5 is a partial view similar to FIG. 4 but showing the belts and feed table in a position for laminating packets.

FIG. 6 is a side view particularly showing the action of the spring on the feed and pressure rollers.

FIG. 7 is a section on the line 7—7 of FIG. 6.

DESCRIPTION OF THE PREFERRED EMBODIMENTS

Figure 1:
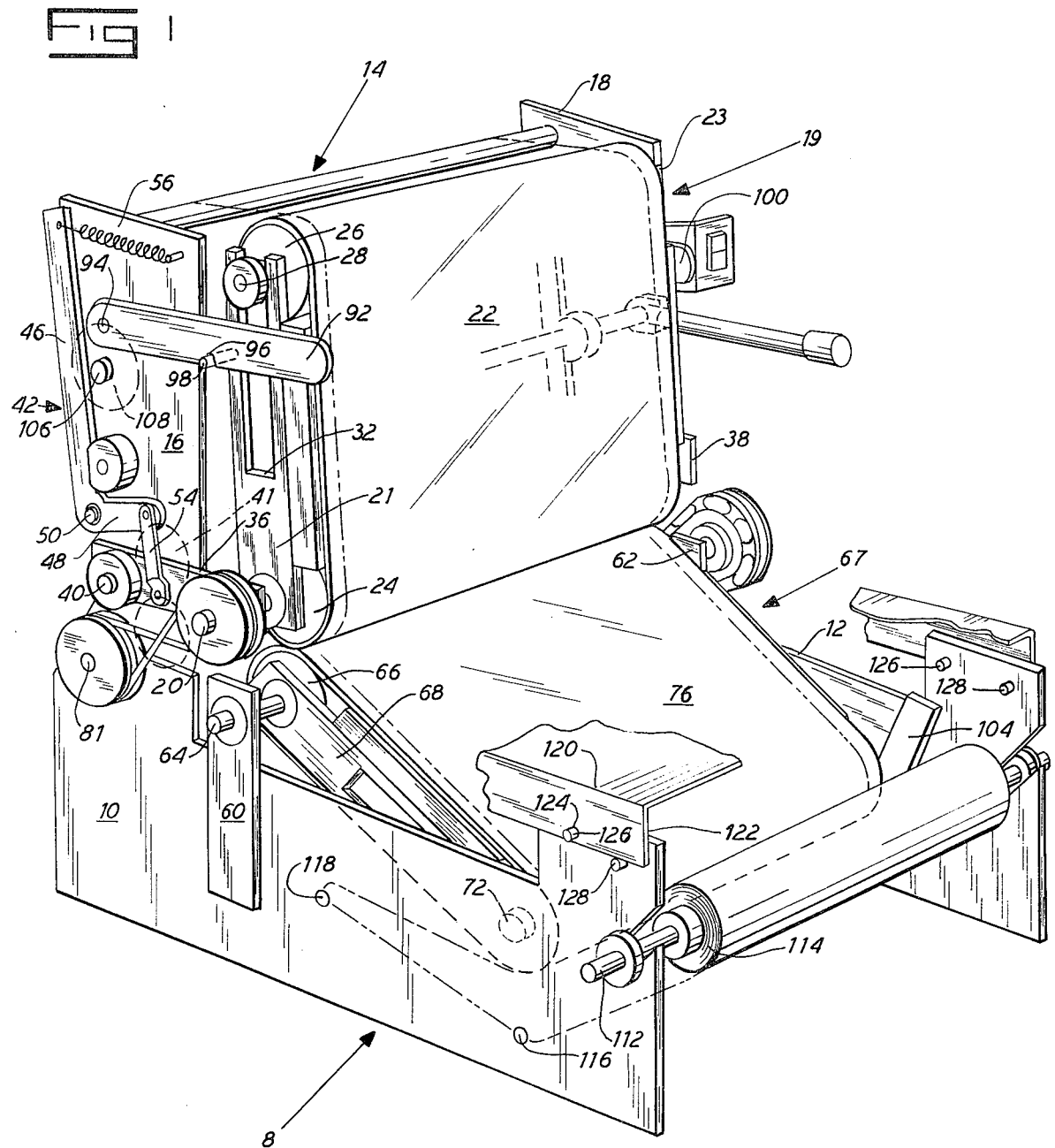
FIG. 1 is a perspective view of a machine embodying the present invention.

Referring now to the drawings by reference characters, there is shown a laminating machine having a main frame generally designated 8 which includes the side members 10 and 12. A subframe 14 which includes the side members 16 and 18 is mounted above the main frame 10.

An upper belt frame, generally designated 19, including side members or arms 21 and 23, has shafts 20 and 28 mounted at each end thereof. Shafts 20 and 28 carry the rollers 24 and 26, respectively, and endless belt 22 is mounted on these rollers. The shaft 28 is mounted on bearings 30 which have a limited sliding movement in slots 32 in the side members and the desired tension is maintained on belt 22 by adjusting screws 34 which press against the bearings 30 to move them outwardly or inwardly in the slots 32. Shaft 20 also serves as the pivot point for the upper belt frame.

The side arms 36 and 38 support shaft 20 for rotation at one end thereof and at the opposite end support for rotation shaft 40. Bell cranks 42 and 44 have a long arm 46 and a short arm 48 and are pivoted at 50 and 52 on the frame members 16 and 18 respectively. Links 54 and 56 connect the short arms of the bell cranks with the center of the arms 36 and 38. Springs 56 and 58 bias the long arms forward, tending to push down on bars 36 and 38. The action is such that shafts 20 and 40 are biased downwardly but independently as is later brought out in detail. Shaft 40 carries the upper pressure roller 41.

Arms 60 and 62 support shaft 64 for rotation and this shaft carries roller 66 as well as serving as the pivot point for the lower belt frame 67. Shaft 64 also supports the side arms 68 and 70 and, at the opposite end of these arms, shaft 72 is mounted for rotation. Shaft 72 carries roller 74 and belt 76 is trained around the rollers 66 and 74. Tension on the belt 76 is regulated by screw 78 in the manner previously described for shaft 28. The belts 22 and 76 are made of a flexible heat-resistant material such as a heat-resistant plastic or even thin, flexible metal. Behind each of the belts is a thermostatically controlled flat heating element. Thus, a flat plate heater 80 is located under belt 22 while a corresponding heater 82 is located under the belt 76. Heater 80 is supported by a metal plate 84 held by clips 82a and consists of a backing of an insulating material 86, a printed circuit heating element 88 and a smooth sheet 90 of a heat conductive material. Heater 82 is of substantially the same construction and is, therefore, not described in detail. The heater elements serve the dual purpose of heating the belts and also support the belts so that they will not sag. Shaft 81 is mounted for rotation on main frame 8 and carries the pressure roller 83.

Figure 2:
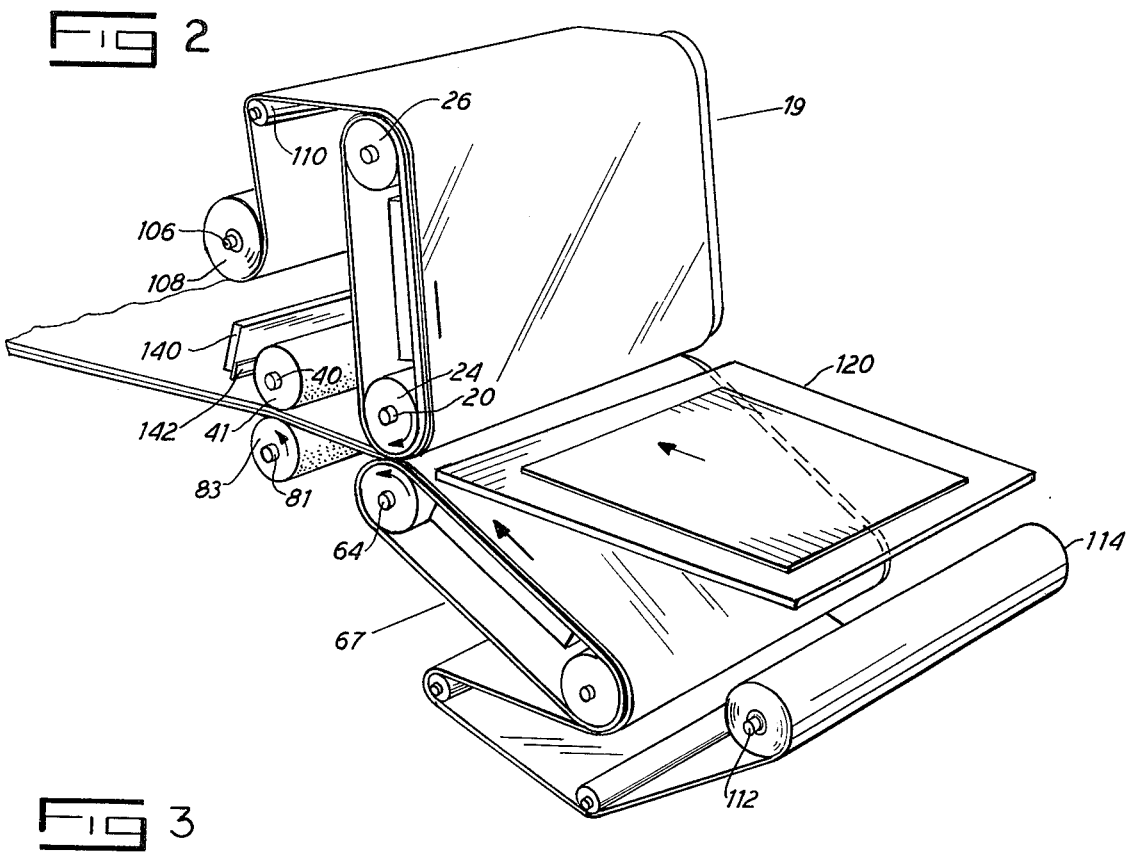
FIG. 2 is a simplified view of the machine of FIG. 1 showing the belt frames in a position for utilizing continuous laminating films.
Figure 3:
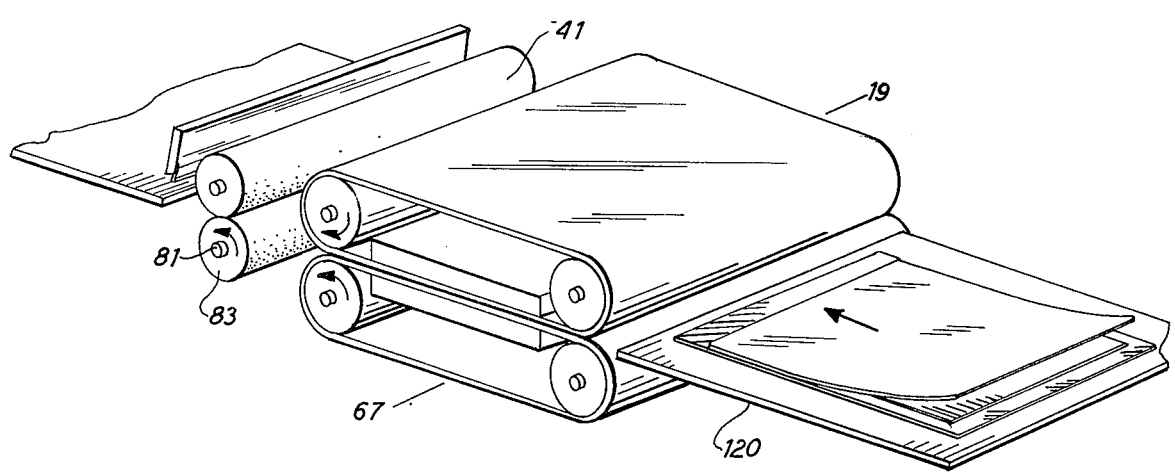
FIG. 3 is a view similar to FIG. 2 but showing the belts in the position to laminate prefabricated packets.

As was previously mentioned, the belt frame can be used in two positions, namely that of FIG. 2 for use with a continuous web of laminating film and the position shown in FIG. 3 for laminating prefabricated packets. The upper belt frame 19 can rotate around shaft 20 while the lower belt frame 67 can rotate around shaft 64 as previously described. The upper belt frame can be held in a vertical position by means of latch 92 which is pivoted at 94 and which has a notch 96 adapted to engage a pin 98 on the arm 21. A mating latch 100 is employed on the opposite side of the machine. Thus, by lifting the latches 92 and 100 the upper belt frame can be released and moved from a vertical position to a substantially horizontal position. Similarly, the lower belt assembly can be held in a horizontal position by means of arms 102 and 104 which support the sidearms 68 and 70. Arms 102 and 104 can be moved forward to allow the belt assembly 67 to move downwardly.

Shaft 106 mounted on the frame members 16 and 18 carries a roll 108 of laminating film which passes over idler roller 110 and then over belt 22 as is later described in detail. Similarly, shaft 112 is mounted on the frame members 10 and 12 and carries a roll of laminating film 114 which passes over idler rollers 116 and 118 and then over belt 76.

A feed table 120 having flanges 122 rests on the frame members 10 and 12, the flanges having a notch 124 therein. The side members are equipped with pins 126 and 128 so that the table 120 can be slid forward and back and locked in one of two positions. The feed table 120 is placed in the forward position when employing a continuous laminating web and is placed in the back position when one is laminating utilizing prefabricated laminating packets.

A motor 130 drives shaft 64 by means of chain 132 and shaft 64 drives shaft 81 through chain 134. The motion from this shaft is reversed through the crossed belt 136 to drive shaft 20. Shaft 40 is not driven directly; pressure from roller 83 drives roller 41.

The side members 16 and 18 carry bar 140 which supports cutting knife 142.

Having described the various parts, the operation of the machine will now be described. Assuming one wishes to laminate a number of articles, the upper belt assembly 19 is brought to a vertical position and locked in place using the latches 92 and 100. The lower belt assembly is brought to its lower position by moving the support arms 102 and 104 forward. The loading table 120 is moved toward the nip of the rollers. A web of film from roll 108 is now brought forward over belt 22 while a similar web is brought from roll 114 over belt 76 so that both webs are engaged by the nip formed between the rollers 24 and 66. The heaters are now turned on and the motor started and articles to be laminated placed on the table 120 and pushed into the nip as is shown in FIG. 2. The laminating films are heated in passing over the belts and are drawn between the rollers 24 and 66 and then through the pressure rollers 41 and 83. The laminating operation is now complete and the individual laminants can be torn apart using the cutting bar 142.

If one now wishes to laminate one or only a few articles utilizing prefabricated packets, the upper roller assembly 19 is released by raising latches 92 and 100 and brought to a horizontal position while the lower roller assembly 67 is brought to the horizontal position and held on supports 102 and 104. Table 120 is moved to its position toward the operator. As is shown in FIG. 3, the laminating packet is placed on the table 120 and pushed between the belts 22 and 76. With this system, the laminating packet is carried by the belts 22 and 76 past the heaters and the need for a separate carrier such as a folded sheet is eliminated. The laminating operation is substantially as previously described although, of course, one would not use the tear bar 142 when utilizing the packet.

Various variations can be made in the exact structure shown without departing from the spirit of this invention. Also, certain construction details have been omitted since these are well known to those skilled in the art such as the thermostatic operation of the heating plates and also the controls for the motor.

We claim as our invention:

1. A laminating machine for use with prefabricated laminating packets formed of two leaves of film with heat activatable adhesive with a product to be laminated being insertable between the leaves, or for use with continuous webs of laminating film having a heat activatable adhesive thereon, comprising: first and second endless belts; heater means for transferring heat through at least one of the belts to the laminating packet or the webs of laminating film; guide means for guiding each belt in a loop pattern having a planar portion; in a first position for laminating packets the planar portions of the two loop patterns being plane parallel to one another and in contact to form a carrying means for transporting the laminating packets adjacent the heater means for heating the heat activatable adhesive to seal the two leaves of film to the product to be laminated; and in a second position for laminating by continuous webs the planar portions of the two loop patterns forming an angle relative to one another with ends of the loop patterns in contact to form a laminating nip for the continuous webs with a product to be laminated therebetween.

2. The machine of claim 1 wherein the guide means include roller means for compressing the laminating packets or webs of film after heating.

3. The machine of claim 1 wherein the guide means comprises first and second rollers positioned within the loop of each endless belt, the first rollers of each belt being adjacent one another and forming, together with the belts, an in-feed nip means for engaging a leading end of the laminating packets when the loop patterns are in the first position, the second rollers of each belt being adjacent one another and forming together with the belts a compressing means for compressing the laminating packets after heating.

4. The machine of claim 1 wherein the heater means comprises a heating plate within the loop pattern of at least one of the endless belts and plane parallel to and adjacent the planar portion of the loop pattern.

5. The machine of claim 4 wherein one of said heating plates is positioned within each endless belt loop pattern.

6. A laminating machine for laminating by alternate methods two leaves of transparent plastic film having heat activatable adhesive with a product to be laminated being insertable between the leaves, comprising: a first endless belt guided in a loop pattern having spaced apart parallel planar portions supported by first and second parallel, spaced apart rollers; a second endless belt guided in a loop pattern having spaced apart parallel planar portions supported by third and fourth parallel, spaced apart rollers; for one of the laminating methods one of the planar portions of the first belt being plane parallel to and in contact with one of the planar portions of the second belt; a heater having a planar surface adjacent one of the planar portions of one of the endless belts; said two planar portions being in contact together with the heater forming means for heating and sealing the plastic film leaves to the product to be laminated; and means for rotating at least one of the loop patterns away from the other loop pattern while maintaining the first and third rollers adjacent one another to serve as a laminating nip in another laminating method.

7. A laminating machine for continuous laminating with first and second continuous webs of laminating film having a heat activatable adhesive thereon, comprising: first and second pairs of rollers and an endless belt surrounding each pair of rollers so as to form first and second loop patterns each with first and second parallel spaced apart planar portions, the second planar portion of the first pattern and the first planar portion of the second pattern forming an angle with a laminating nip being formed at an apex of the angle by one of the rollers of each loop pattern; first means for guiding the first continuous web of laminating film over the first loop pattern second portion and second means for guiding the second continuous web of laminating film over the second loop pattern first portion; first heating means within the first loop pattern and adjacent the first loop pattern second portion for heating the first continuous web; and second heating means within the second loop pattern and adjacent the second loop pattern first portion for heating the second continuous web.

8. The machine of claim 7 wherein the first and second heating means are positioned so as to heat the first and second webs through the respective endless belts.

9. The machine of claim 7 wherein a pinch roller means is positioned rearwardly of the first and second rollers for engaging and pulling a product after lamination.

10. The machine of claim 7 wherein a cutting means is positioned rearwardly of the first and second rollers for cutting a product after lamination.

11. A convertible laminating machine, comprising:
(a) a first endless belt in contact with first and second rollers and a first heating means positioned so as to transfer heat through the endless belt;
(b) a second endless belt in contact with third and fourth rollers; and
(c) the first and third rollers being parallel and adjacent one another such that the first and second endless belts contact between the first and third rollers, the second and fourth rollers in a first laminating position being adjacent one another such that a planar portion of each endless belt are in mutual contact with one another, and in a second laminating position the second and fourth being spaced apart such that the endless belt planar portions form an angle with the apex between the first and third rollers.

* * * * *